(12) United States Patent
Lin et al.

(10) Patent No.: US 10,931,801 B2
(45) Date of Patent: Feb. 23, 2021

(54) BUTTON ASSEMBLY

(71) Applicant: Cheng Uei Precision Industry Co., LTD., New Taipei (TW)

(72) Inventors: Chih-Chiang Lin, New Taipei (TW); Te-Hung Yin, New Taipei (TW); Chun-Fu Lin, New Taipei (TW); Sheng-Nan Yu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/533,779

(22) Filed: Aug. 6, 2019

(65) Prior Publication Data
US 2020/0366769 A1    Nov. 19, 2020

(30) Foreign Application Priority Data
May 15, 2019   (CN) .......................... 201920702951.1

(51) Int. Cl.
| H04M 1/02 | (2006.01) |
|---|---|
| H04B 1/3818 | (2015.01) |
| G06K 13/08 | (2006.01) |

(52) U.S. Cl.
CPC .......... *H04M 1/026* (2013.01); *H04B 1/3818* (2015.01); *G06K 13/0831* (2013.01)

(58) Field of Classification Search
CPC .. G06K 13/0831; H04B 1/3818; H04M 1/026

USPC ......................................................... 379/340
See application file for complete search history.

(56) References Cited

U.S. PATENT DOCUMENTS

| 8,614,897 | B2 * | 12/2013 | Tang | G06K 13/08 361/752 |
|---|---|---|---|---|
| 10,148,302 | B1 * | 12/2018 | Wu | H04B 1/3818 |
| 2013/0130527 | A1 * | 5/2013 | Lee | G06K 13/08 439/159 |
| 2014/0078660 | A1 * | 3/2014 | Dondzik | H04B 1/3816 361/679.31 |

* cited by examiner

*Primary Examiner* — Hemant S Patel
(74) *Attorney, Agent, or Firm* — Cheng-Ju Chiang

(57) ABSTRACT

A button assembly includes a pressing element, a tray, and a locking structure fastened between the pressing element and the tray. One side surface of the pressing element is recessed inward to form an accommodating space. The pressing element opens at least one first upper fixing hole. A bottom surface of the pressing element is recessed upward to form a first accommodating slot. The first accommodating slot opens at least one first opening. The tray of which one side is connected with the pressing element. The one side of the tray has a base portion mounted in the accommodating space. The base portion opens at least one second opening. A bottom surface of a peripheral wall of the at least one second opening is recessed upward to form at least one locking slot. The locking structure includes at least one locking element and an elastic arm.

10 Claims, 14 Drawing Sheets

BUTTON ASSEMBLY

CROSS-REFERENCE TO RELATED APPLICATION

The present application is based on, and claims priority form, China Patent Application No. 201920702951.1, filed May 15, 2019, the disclosure of which is hereby incorporated by reference herein in its entirety.

BACKGROUND OF THE INVENTION

1. Field of the Invention

The present invention generally relates to a button assembly, and more particularly to a button assembly capable of saving an assembling space of internal components of a communication equipment to which the button assembly is assembled.

2. The Related Art

With the development of sciences and technologies, in order to make communication equipment have more functions and stronger efficiencies, more and newer components need be carried. Nevertheless, due to a user's feeling in use, a volume of the communication equipment is difficult to be adjusted, it needs to adjust volumes or assembling devices of original internal components.

However, a conventional communication device is equipped with a subscriber identity module (SIM) card having functions of storing user identification data, message data, and telephone numbers. Due to a limitation of the SIM card, a volume of the SIM card has no way of proceeding being reduced by applying a current technology. Therefore, a card tray of the SIM card must be combined with other components, and the original internal components can be combined with one another to save an assembling space of original internal components of the communication equipment. More remaining space for adding new components are achieved, so that the communication equipment is capable of carrying the more and newer functions.

Therefore, it is necessary to provide an innovative button assembly applied in a communication equipment, so that the innovative button assembly for adjusting a sound volume of the communication equipment is capable of being combined with the SIM card to save an assembling space of internal components of the communication equipment to which the innovative button assembly is assembled.

SUMMARY OF THE INVENTION

An object of the present invention is to provide a button assembly applied in a communication equipment. The button assembly includes a pressing element, a tray, and a locking structure fastened and connected between the pressing element and the tray. One side surface of the pressing element is recessed inward to form an accommodating space. Atop of the pressing element opens at least one first upper fixing hole communicated with the accommodating space. A middle of a bottom surface of the pressing element is recessed upward to form a first accommodating slot. A top wall of the first accommodating slot opens at least one first opening communicated with the accommodating space. The tray of which one side is mounted to and connected with the pressing element. The one side of the tray has a base portion. The base portion is mounted in the accommodating space. The base portion opens at least one second opening corresponding to the at least one first upper fixing hole. A bottom surface of a peripheral wall of the at least one second opening is recessed upward to form at least one locking slot around and communicated with the at least one second opening. The locking structure includes at least one locking element and an elastic arm. One end of the at least one locking element has a first blocking portion. A middle of the first blocking portion of the at least one locking element protrudes upward to form a first locking portion corresponding to the at least one second opening and the at least one locking slot. The at least one locking element passes through the at least one first upper fixing hole, the at least one second opening and the at least one first opening corresponding to the at least one first upper fixing hole. The elastic arm is accommodated in the first accommodating slot. The elastic arm abuts upward against each first blocking portion of each locking element. A portion of the at least one locking element is exposed to the at least one first upper fixing hole. The first locking portion of the at least one locking element is assembled in the at least one second opening through the at least one locking slot. When the button assembly is installed in the communication equipment, the at least one locking element is pressed inward towards the pressing element by a bottom inner wall of the communication equipment, the first locking portion of the at least one locking element breaks away from the at least one locking slot, so that the tray is loosened from the pressing element.

Another object of the present invention is to provide a button assembly. The button assembly applied in a communication equipment. A lateral wall of the communication equipment opens a fastening slot. The button assembly includes a pressing element, a tray, and a locking structure fastened between the pressing element and the tray. One side surface of the pressing element protrudes outward to form a combination portion opening a perforation. The tray is mounted to the pressing element. The tray opens a receiving space penetrating through a rear surface of the tray and a bottom surface of the tray. The receiving space is matched with and corresponding to the combination portion. The tray opens a through-hole corresponding to the perforation and communicated with the receiving space. The locking structure includes a fastening element and a resilient element. One end of the fastening element has a stopping portion. A top surface of the stopping portion protrudes upward to form an insertion portion corresponding to the perforation. The insertion portion passes through the perforation, and the through-hole. The resilient element is received in the receiving space. The resilient element abuts upward against the fastening element to make a top portion of the insertion portion of the fastening element exposed to the through-hole. When the button assembly is installed in the fastening slot, a top wall of the fastening slot abuts against the top portion of the fastening element to push the fastening element to move inward and into the fastening slot, at the moment, the insertion portion of the fastening element breaks away from the perforation, so that the tray is loosened from the pressing element.

Another object of the present invention is to provide a button assembly applied in a communication equipment. A lateral wall of the communication equipment opens a fastening slot. The button assembly includes a pressing element, a tray, and a locking structure fastened between the pressing element and the tray, and connected between the pressing element and the tray. One side surface of the pressing element protrudes outward to form a combination portion. The combination portion opens a perforation. A bottom surface of a peripheral wall of the perforation being recessed upward to form a restricting slot. The tray is mounted to the pressing element. One end of the tray facing the pressing element opens a receiving space penetrating through a rear surface of the tray facing the pressing element and a bottom surface of the tray. The receiving space is matched with and corresponding to the combination portion. The one end of the tray opens a through-hole. The through-hole is corresponding to the perforation and is communicated with the receiving space. The locking structure includes a fastening element and a resilient element. One end of the fastening element has a stopping portion. A top surface of the stopping portion protrudes upward to form an insertion portion corresponding to the perforation. The insertion portion passes through the perforation, the restricting slot and the through-hole. The resilient element is mounted to bottoms of the tray and the pressing element, and received in the receiving space. The resilient element abuts upward against the fastening element to make a top portion of the insertion portion of the fastening element exposed to the through-hole. When the button assembly is installed in the fastening slot of the communication equipment, a top wall of the fastening slot abuts against the top portion of the fastening element to push the fastening element to move inward and into the fastening slot, at the moment, the insertion portion of the fastening element breaks away from the perforation and the restricting slot, so that the tray is loosened from the pressing element.

As described above, the pressing element and the tray of the button assembly are fixed with each other or loosened from each other by means of the button assembly being equipped with the at least one locking element or the fastening element of the locking structure, the through-hole or the perforation, and the elastic arm or the resilient element, so that the pressing element and the tray are capable of being fastened with each other at the time of the pressing element and the tray being without being installed in the communication equipment. The pressing element and the tray is capable of being loosened from each other at the time of the button assembly being installed in the communication equipment. When the user presses two opposite ends of the pressing element to activate a function of increasing or decreasing the volume of the communication equipment, the pressing element is caused to rotate, the tray can be unaffected by a rotation of the pressing element, so that the tray keeps a fixation status in a shell, in this way, the pressing element and the tray are combined to save an assembling space of internal components of the communication equipment to which the button assembly is assembled.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
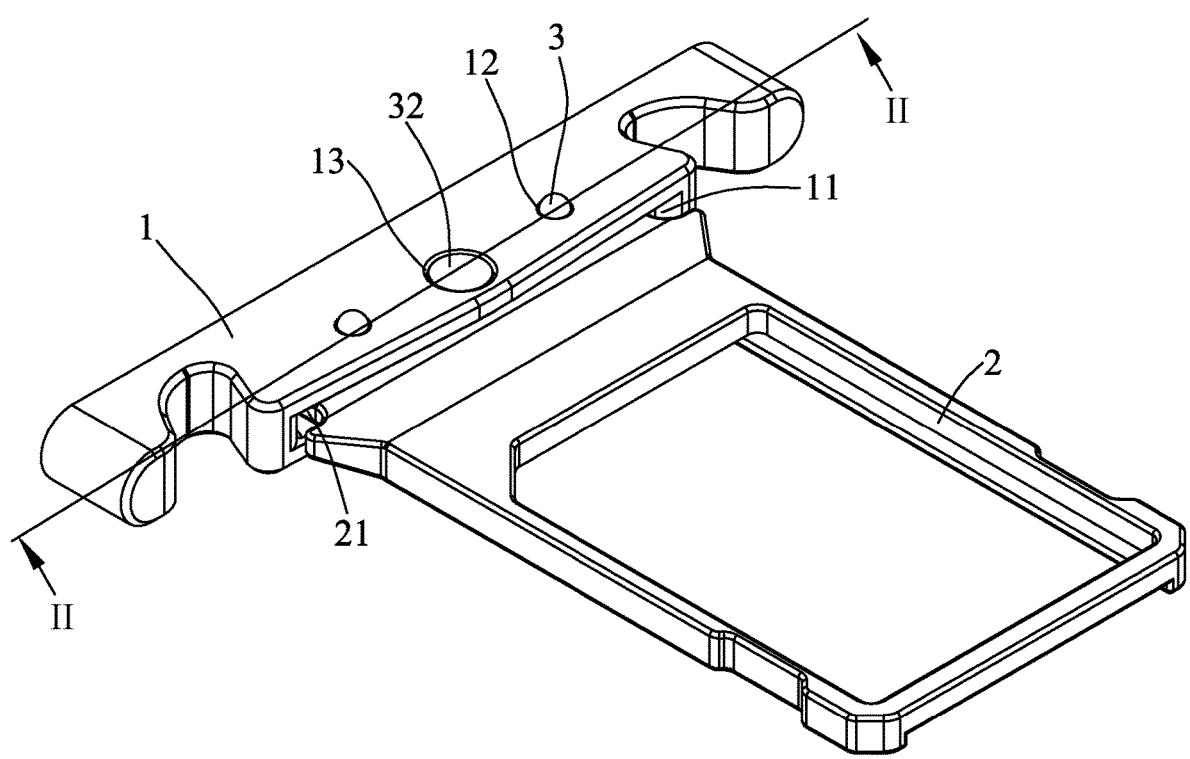
FIG. 1 is a perspective view of a button assembly in accordance with a first preferred embodiment of the present invention.
Figure 2:
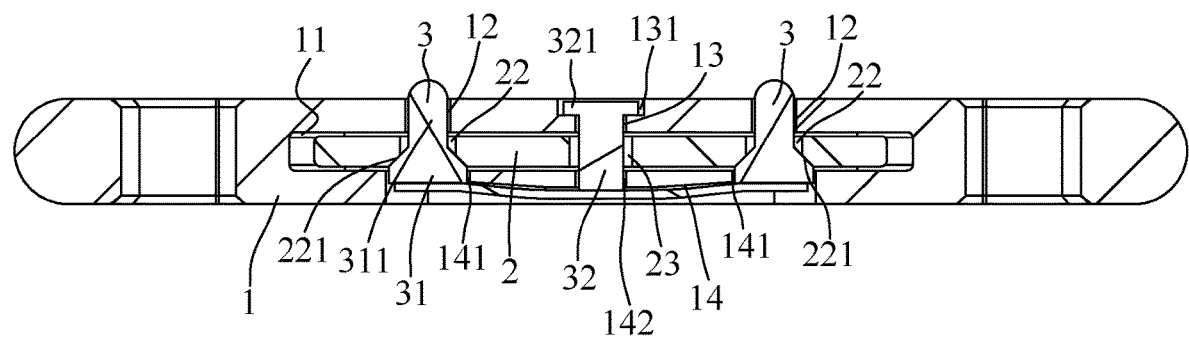
FIG. 2 is a sectional view of the button assembly in accordance with the first preferred embodiment of the present invention along a line II-II of FIG. 1.
Figure 3:
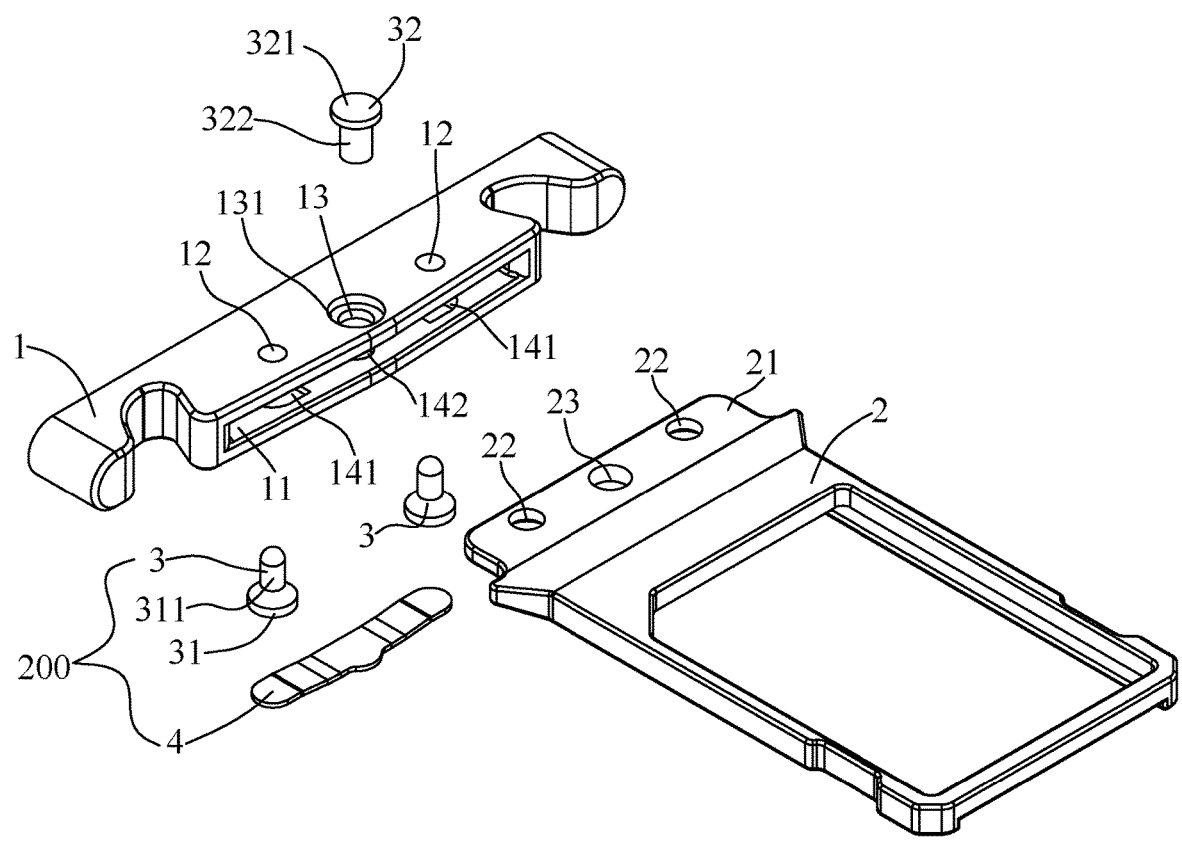
FIG. 3 is an exploded perspective view of the button assembly in accordance with the first preferred embodiment of the present invention of FIG. 1.
Figure 4:
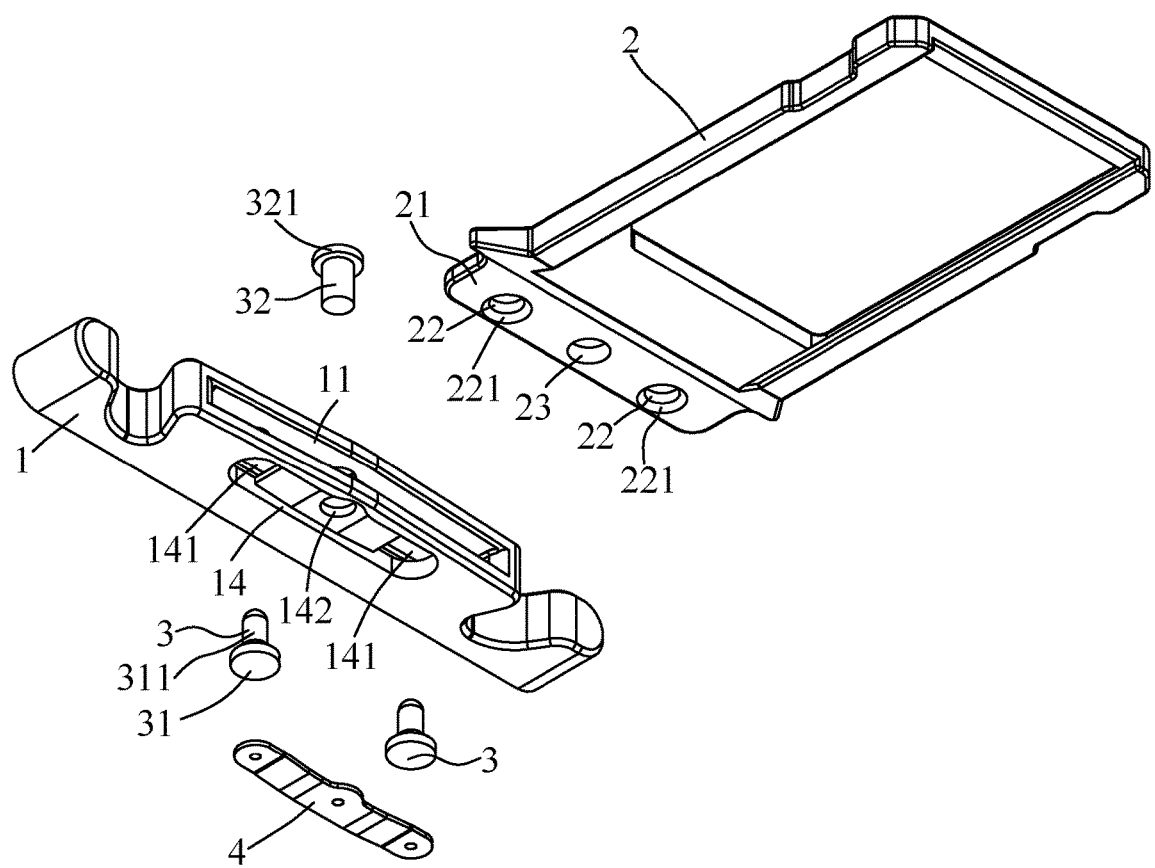
FIG. 4 is another exploded perspective view of the button assembly in accordance with the first preferred embodiment of the present invention of FIG. 3.
Figure 5:
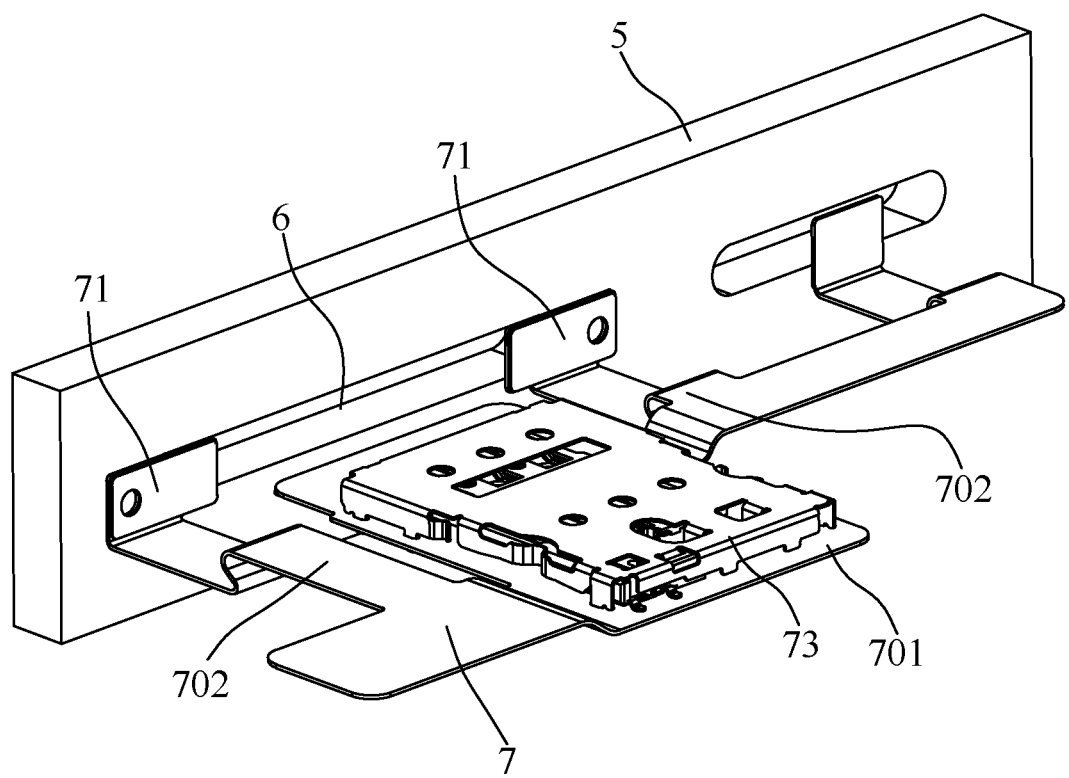
FIG. 5 is a perspective view showing that an internal component disposed to a lateral wall of a communication equipment.

With reference to FIG. 1 to FIG. 5, a button assembly 100 in accordance with the present invention is shown. The button assembly 100 is applied in a communication equipment 300. The button assembly 100 in accordance with a first preferred embodiment of the present invention, includes a pressing element 1, a tray 2, and a locking structure 200 fastened between the pressing element 1 and the tray 2, and connected between the pressing element 1 and the tray 2.

Figure 6:
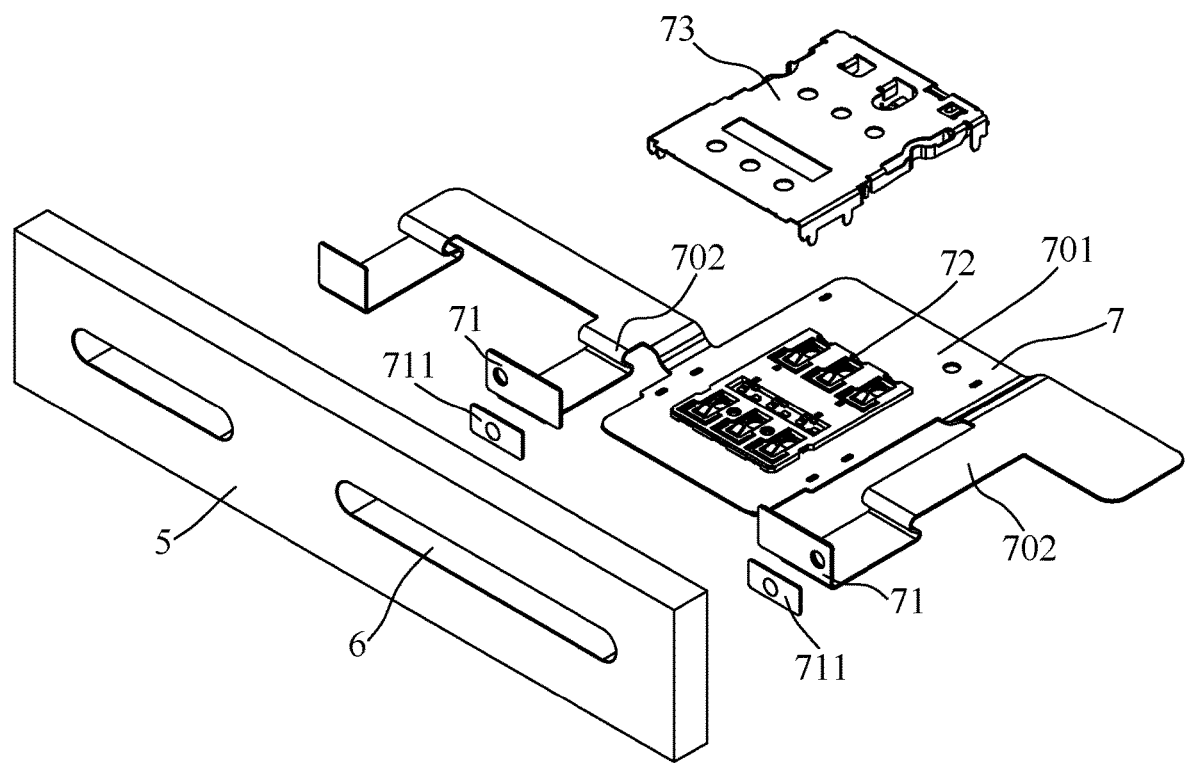
FIG. 6 is an exploded perspective view showing the internal component, a circuit board and the lateral wall of the communication equipment of FIG. 5.
Figure 7:
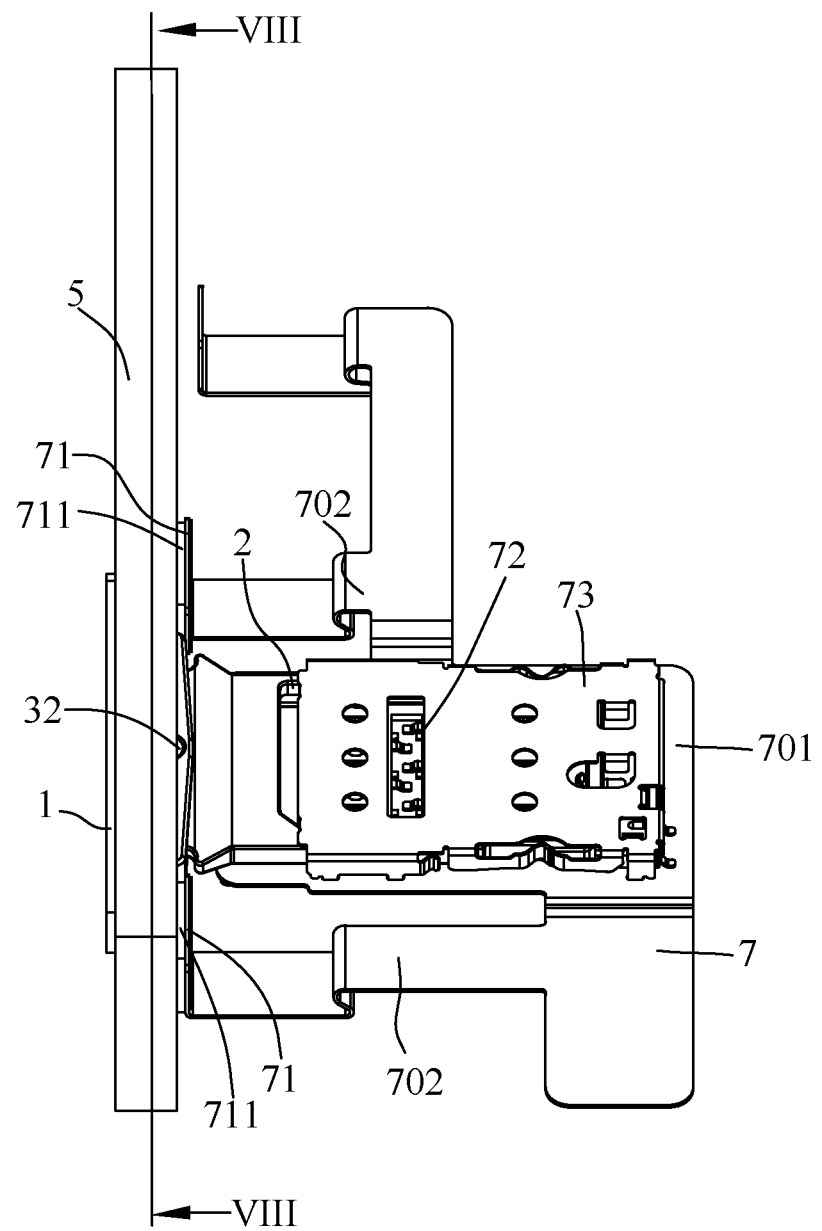
FIG. 7 is a perspective view showing the button assembly installed in the internal component disposed to the lateral wall of the communication equipment in accordance with the present invention.

With reference to FIG. 1 to FIG. 7, a middle of one side surface of the pressing element 1 is recessed inward to form an accommodating space 11. Atop of the pressing element 1 opens at least one first upper fixing hole 12 communicated with the accommodating space 11. The top of the pressing element 1 opens a plurality of first upper fixing holes 12 communicated with the accommodating space 11. In this first preferred embodiment, the top of the pressing element 1 opens two first upper fixing holes 12 communicated with the accommodating space 11. The top of the pressing element 1 further opens a second upper fixing hole 13 located between the two first upper fixing holes 12. The second upper fixing hole 13 is communicated with the accommodating space 11. Atop surface of a peripheral wall of the second upper fixing hole 13 is recessed downward to form an upper limiting slot 131 communicated with and around the second upper fixing hole 13. A middle of a bottom surface of the pressing element 1 is recessed upward to form a first accommodating slot 14. A top wall of the first accommodating slot 14 opens at least one first opening 141 penetrating upward through the top wall of the first accommodating slot 14 and communicated with the accommodating space 11. The top wall of the first accommodating slot 14 opens a plurality of first openings 141 penetrating upward through the top wall of the first accommodating slot 14 and communicated with the accommodating space 11. In the first preferred embodiment, two opposite sides of the top wall of the first accommodating slot 14 open two first openings 141. A middle of the top wall of the first accommodating slot 14 opens a lower first fixing hole 142 penetrating upward through the middle of the top wall of the first accommodating slot 14, and located between the two first openings 141. The lower first fixing hole 142 is communicated with the accommodating space 11 and is corresponding to the second upper fixing hole 13.

The tray 2 of which one side is mounted to and connected with the pressing element 1. The one side of the tray 2 has a base portion 21. A rear of the tray 2 has the base portion 21. The base portion 21 is mounted in the accommodating space 11. The base portion 21 opens at least one second opening 22 vertically penetrating through the base portion 21. The at least one second opening 22 is corresponding to the at least one first upper fixing hole 12. The base portion 21 opens a plurality of second openings 22 vertically penetrating through the base portion 21. The plurality of the second openings 22 are corresponding to the plurality of the first upper fixing holes 12. In the first preferred embodiment, the base portion 21 opens two second openings 22 corresponding to the two first upper fixing holes 12, respectively. A bottom surface of a peripheral wall of the at least one second opening 22 is recessed upward to form at least one locking slot 221 around and communicated with the at least one second opening 22. A bottom surface of a peripheral wall of each second opening 22 is recessed upward to form the locking slot 221 around and communicated with the second opening 22. The base portion 21 further opens a fastening hole 23 vertically penetrating through the base portion 21 and located between the two second openings 22. The fastening hole 23 is corresponding to the second upper fixing hole 13.

With reference to FIG. 1 to FIG. 7, the locking structure 200 is assembled between the pressing element 1 and the tray 2. The locking structure 200 includes at least one locking element 3 and an elastic arm 4. One end of the at least one locking element 3 has a first blocking portion 31. A middle of the first blocking portion 31 of the at least one locking element 3 protrudes upward to form a first locking portion 311 corresponding to the at least one second opening 22 and the at least one locking slot 221. In the first preferred embodiment, the locking structure 200 includes two locking elements 3. The at least one locking element 3 passes through the at least one first upper fixing hole 12, the at least one second opening 22 and the at least one first opening 141 corresponding to the at least one first upper fixing hole 12. The locking structure 200 of the button assembly 100 further has a fixing element 32. The fixing element 32 has a second blocking portion 321, and a second locking portion 322 protruded downward from a middle of a bottom surface of the second blocking portion 321. The second locking portion 322 of the fixing element 32 passes through the second upper fixing hole 13, the fastening hole 23 and the lower first fixing hole 142. The second blocking portion 321 of the fixing element 32 is limited in the upper limiting slot 131.

Simultaneously, the locking structure 200 includes a plurality of locking elements 3 and the elastic arm 4. One end of each locking element 3 has the first blocking portion 31. A middle of the first blocking portion 31 of each locking element 3 protrudes upward to form the first locking portion 311 corresponding to one second opening 22 and one locking slot 221. Each locking element 3 passes through one first upper fixing hole 12, the one second opening 22 and one first opening 141 corresponding to the one first upper fixing hole 12.

The elastic arm 4 is accommodated in the first accommodating slot 14. The elastic arm 4 is fastened to bottoms of the fixing element 32 and the first blocking portion 31 of each locking element 3 by a spot welding way or a riveting press way. The elastic arm 4 abuts upward against and contacts the first blocking portion 31 of each locking element 3. The elastic arm 4 covers and abuts against each locking element 3, so that a portion of the at least one locking element 3 is exposed to the at least one first upper fixing hole 12. The first locking portion 311 of the at least one locking element 3 is assembled in the at least one second opening 22 through the at least one locking slot 221. When the button assembly 100 is installed in the communication equipment 300, the at least one locking element 3 is pressed inward towards the pressing element 1 by a bottom inner wall of the communication equipment 300, the first locking portion 311 of the at least one locking element 3 breaks away from the at least one locking slot 221, so that the tray 2 is loosened from the pressing element 1. The first locking portion 311 of the at least one locking element 3 is assembled in the at least one second opening 22 through the at least one locking slot 221, so that the pressing element 1 and the tray 2 are fixed with each other.

A portion of each locking element 3 is exposed to one first upper fixing hole 12. The first locking portion 311 of each locking element 3 is assembled in the one second opening 22 through the one locking slot 221. When the button assembly 100 is installed in the communication equipment 300, each locking element 3 is pressed inward towards the pressing element 1 by the bottom inner wall of the communication equipment 300, the first locking portion 311 of each locking element 3 breaks away from the locking slot 221, so that the tray 2 is loosened from the pressing element 1. The first locking portion 311 of each locking element 3 is assembled in the one second opening 22 through the locking slot 221, so that the pressing element 1 and the tray 2 are fixed with each other.

Figure 8:
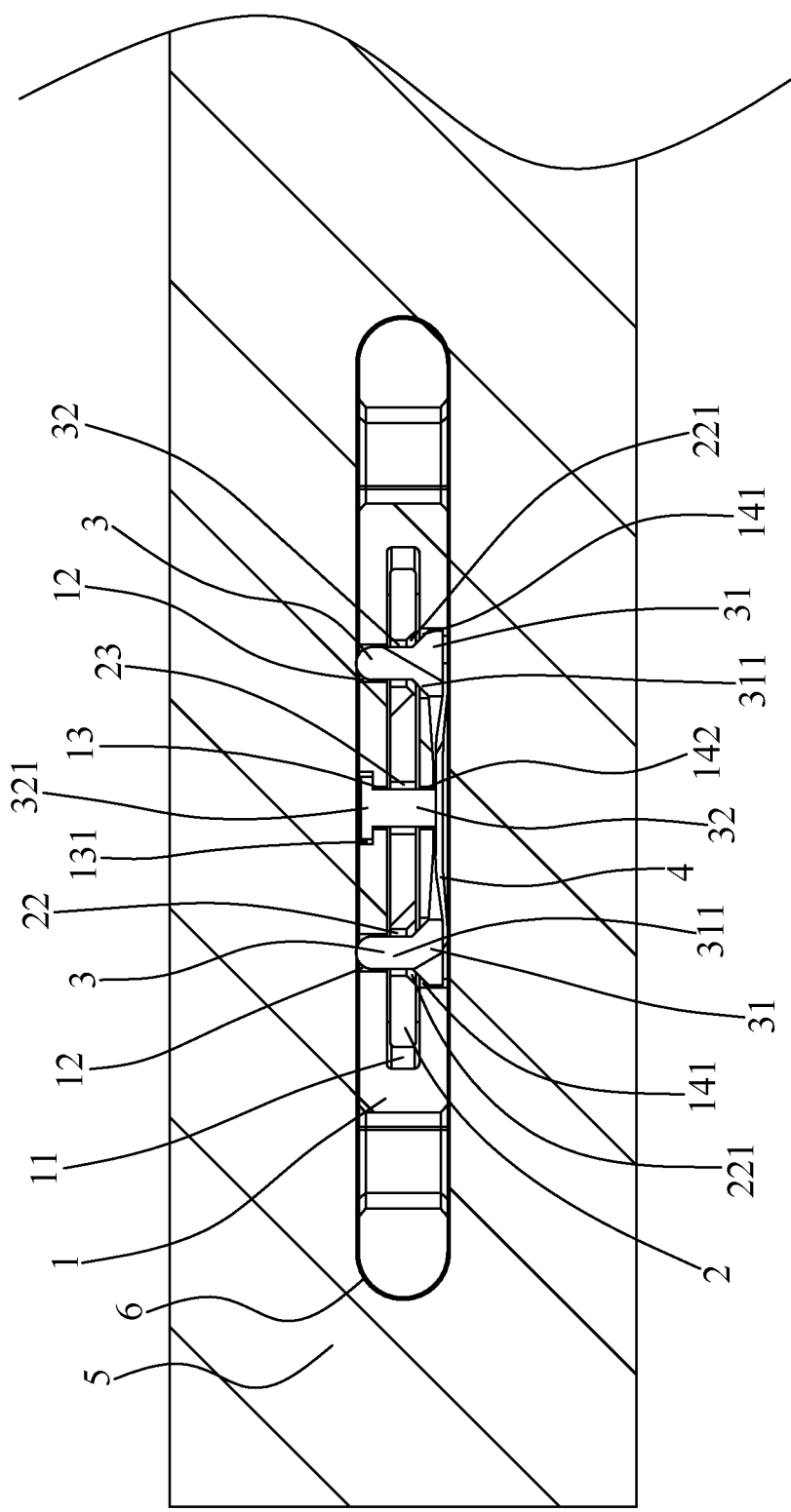
FIG. 8 is a sectional view of the button assembly installed in the internal component disposed to the lateral wall of the communication equipment in accordance with the present invention along a line VIII-VIII of FIG. 7.

With reference to FIG. 1 to FIG. 8, the communication equipment 300 has a lateral wall 5. The lateral wall 5 of the communication equipment 300 opens a fastening slot 6 longitudinally penetrating through the lateral wall 5 of the communication equipment 300. The button assembly 100 is installed in the fastening slot 6 of the lateral wall 5 of the communication equipment 300. The communication equipment 300 further includes a circuit board 7. The circuit board 7 is fastened to the fastening slot 6. The circuit board 7 has a base plate 701 disposed horizontally, and two button pieces 711. Two opposite sides of the base plate 701 of the circuit board 7 are curved frontward and then extend rearward to form two connecting portions 702. Tops of the two connecting portions 702 extend upward to form two extending portions 71. Each extending portion 71 is equipped with one button piece 711. The two button pieces 711 are corresponding to two opposite ends of the pressing element 1, respectively. The two button pieces 711 have a function of increasing a volume of the communication equipment 300 and decreasing the volume of the communication equipment 300, respectively. The communication equipment 300 further includes a terminal assembly 72 and a shell 73. The terminal assembly 72 is mounted to the circuit board 7. The terminal assembly 72 is disposed in front of an interval between the two extending portions 71. The shell 73 is mounted on the circuit board 7 and covers the terminal assembly 72.

With reference to FIG. 1 to FIG. 8 again, when the button assembly 100 is installed in the fastening slot 6 of the communication equipment 300, the tray 2 is installed in the shell 73. The two opposite ends of the pressing element 1 abut against the two button pieces 711, a user who uses the communication equipment 300 can alternatively press the two opposite ends of the pressing element 1 to press the corresponding two button pieces 711 to activate the function of increasing the volume of the communication equipment 300 and decreasing the volume of the communication equipment 300. Each locking element 3 is pressed inward towards the pressing element 1 by a bottom inner wall of the fastening slot 6, at the same time, the elastic arm 4 accumulates an elastic force by virtue of the elastic arm 4 being abutted by each locking element 3. Whereas the first locking portion 311 of each locking element 3 breaks away from the one second opening 22 and the locking slot 221 around the one second opening 22, so that the tray 2 is loosened from the pressing element 1, and the tray 2 further breaks away from the pressing element 1. When the user presses either end of the pressing element 1, the pressing element 1 will proceed a rotary displacement pivoting the fixing element 32, and a gap is provided between each second opening 22 and one locking element 3 for facilitating a movement of the pressing element 1 at the time of the pressing element 1 being pressed to rotate, so the tray 2 will be without being carried to move with the pressing element 1. In this way, the tray 2 keeps a fixation status in the shell 73.

When the button assembly 100 is withdrawn from the communication equipment 300, the elastic force accumulated by the elastic arm 4 will make each locking element 3 return to an initial position, so that each first locking portion 311 is reinstalled into the one second opening 22 to fix the pressing element 1 and the tray 2 with each other again.

Figure 9:
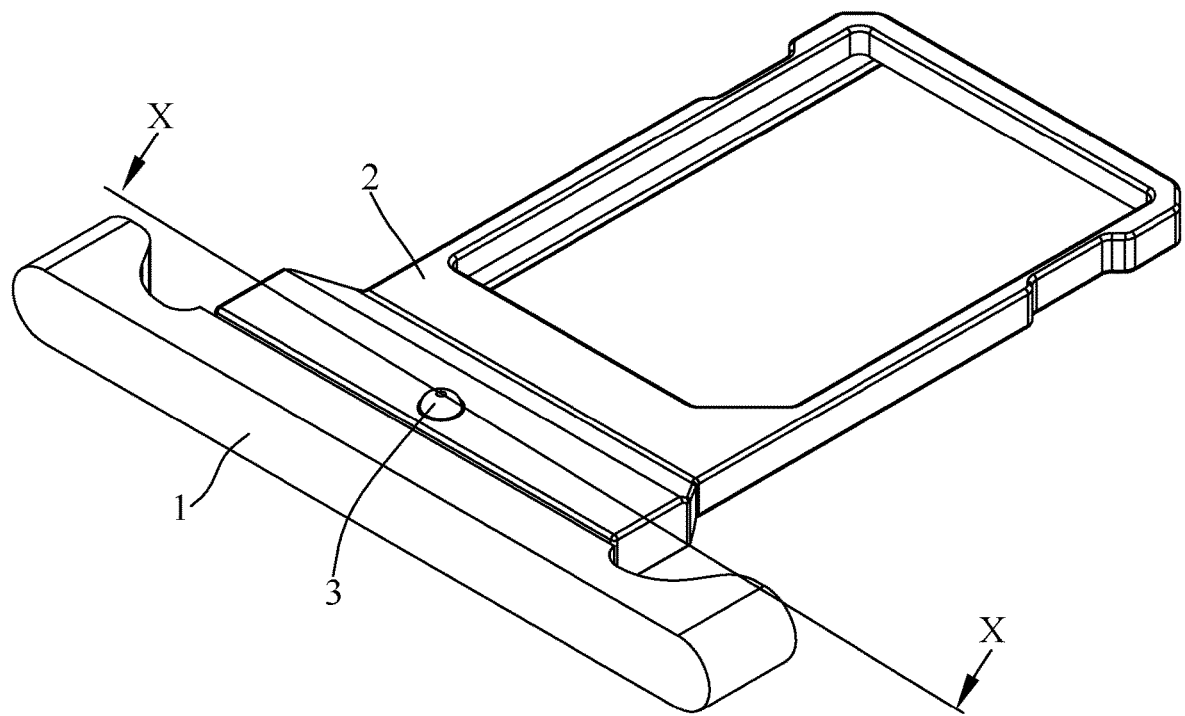
FIG. 9 is a perspective view of a button assembly in accordance with a second preferred embodiment of the present invention.
Figure 10:
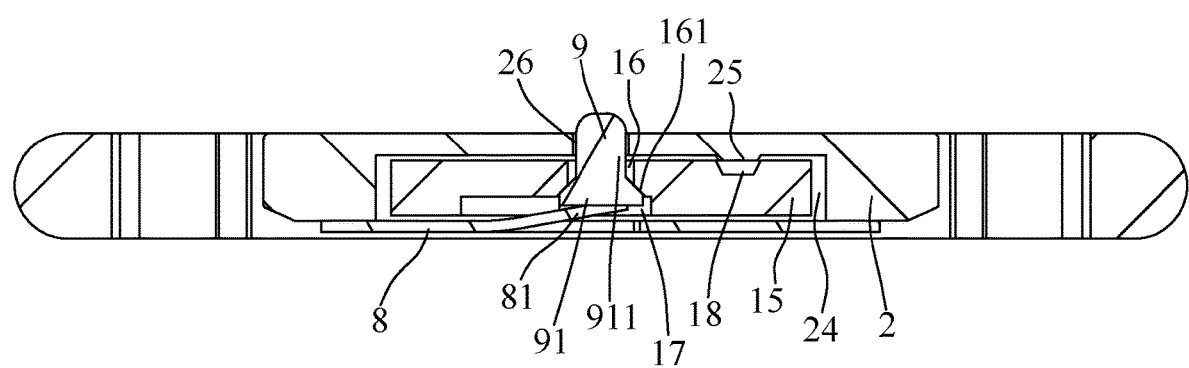
FIG. 10 is a sectional view of the button assembly along a line X-X of FIG. 9.
Figure 11:
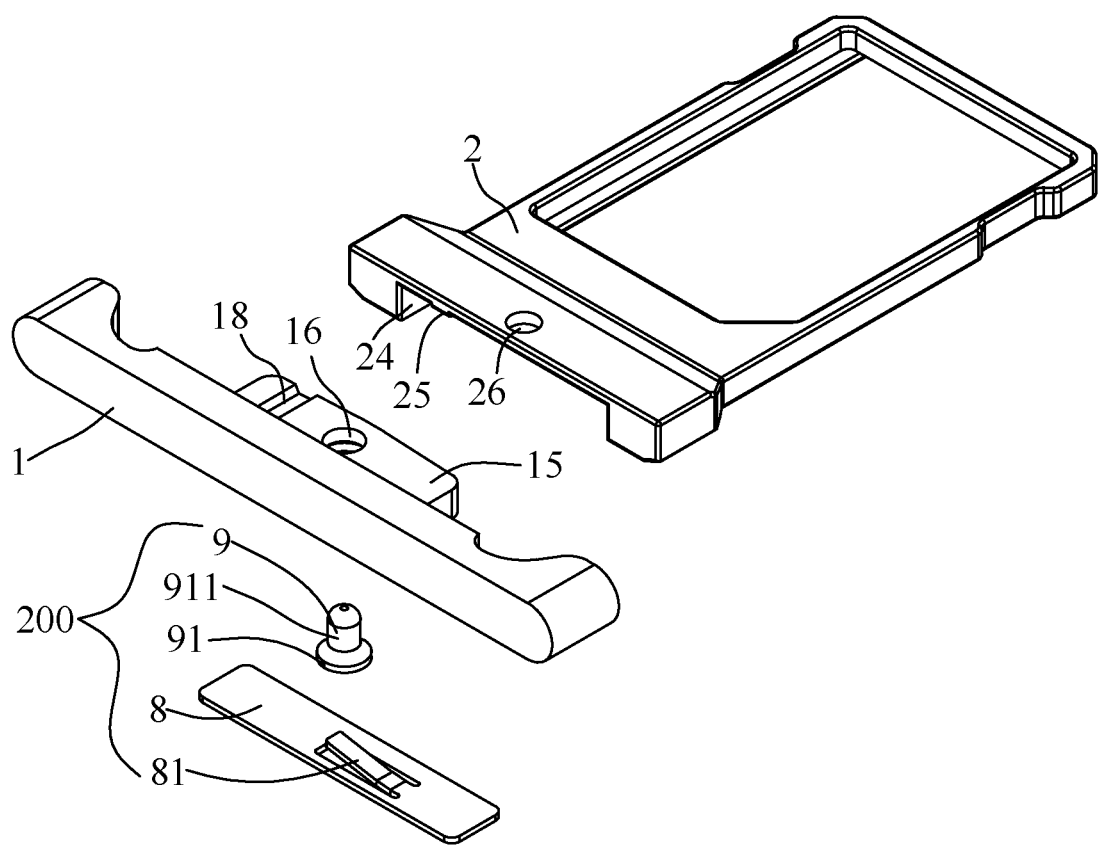
FIG. 11 is an exploded perspective view of the button assembly of FIG. 9.
Figure 12:
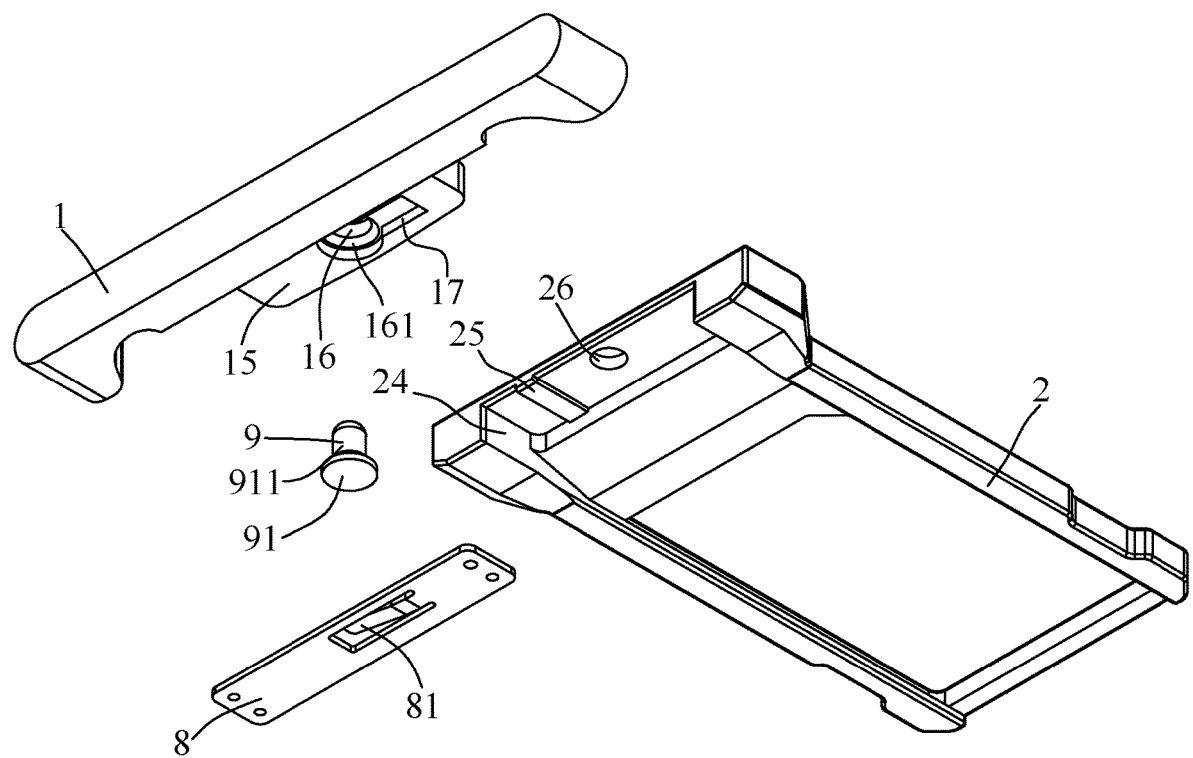
FIG. 12 is another exploded perspective view of the button assembly of FIG. 11.
Figure 13:
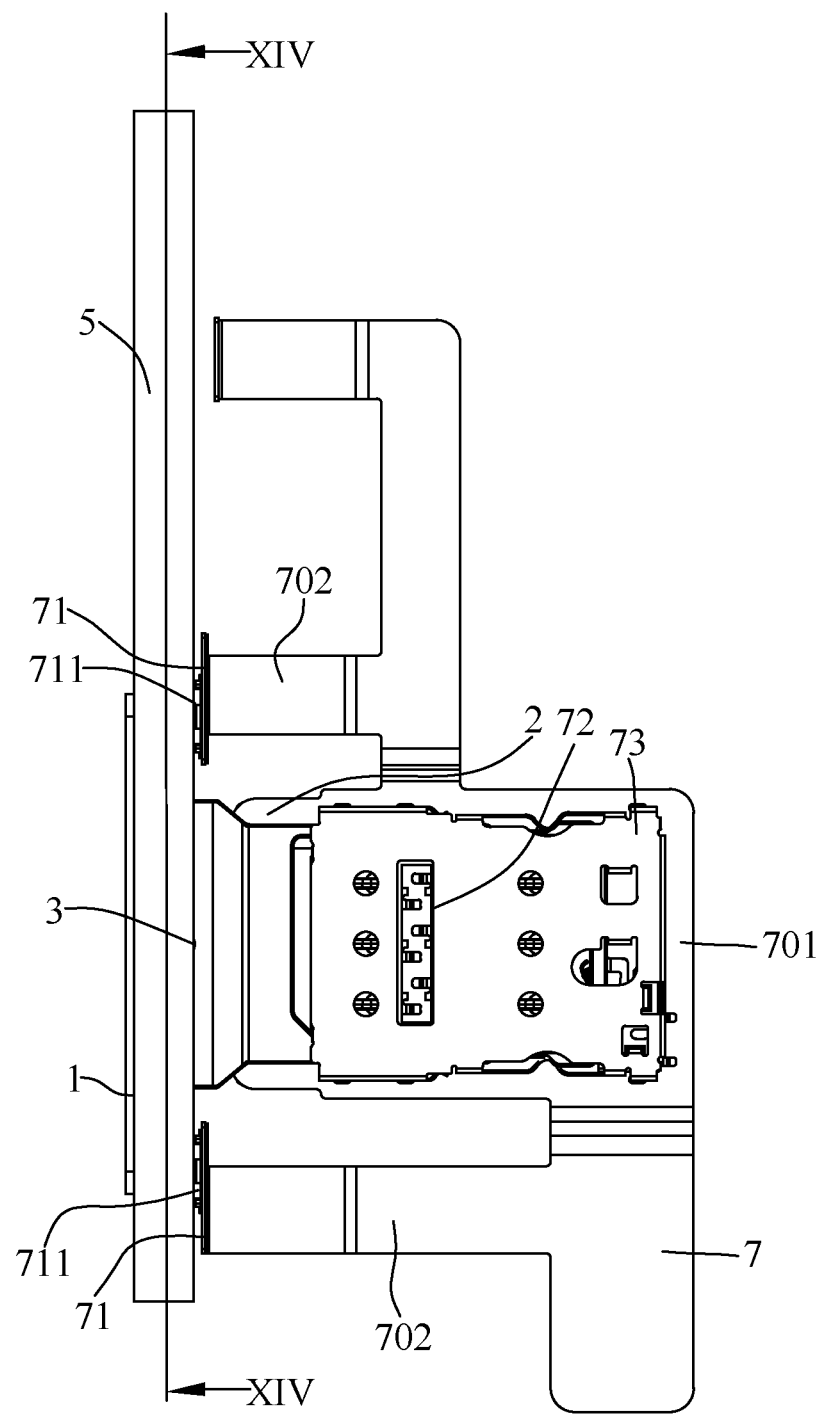
FIG. 13 is another perspective view showing the button assembly installed in the internal component disposed to the lateral wall of the communication equipment in accordance with the present invention.
Figure 14:
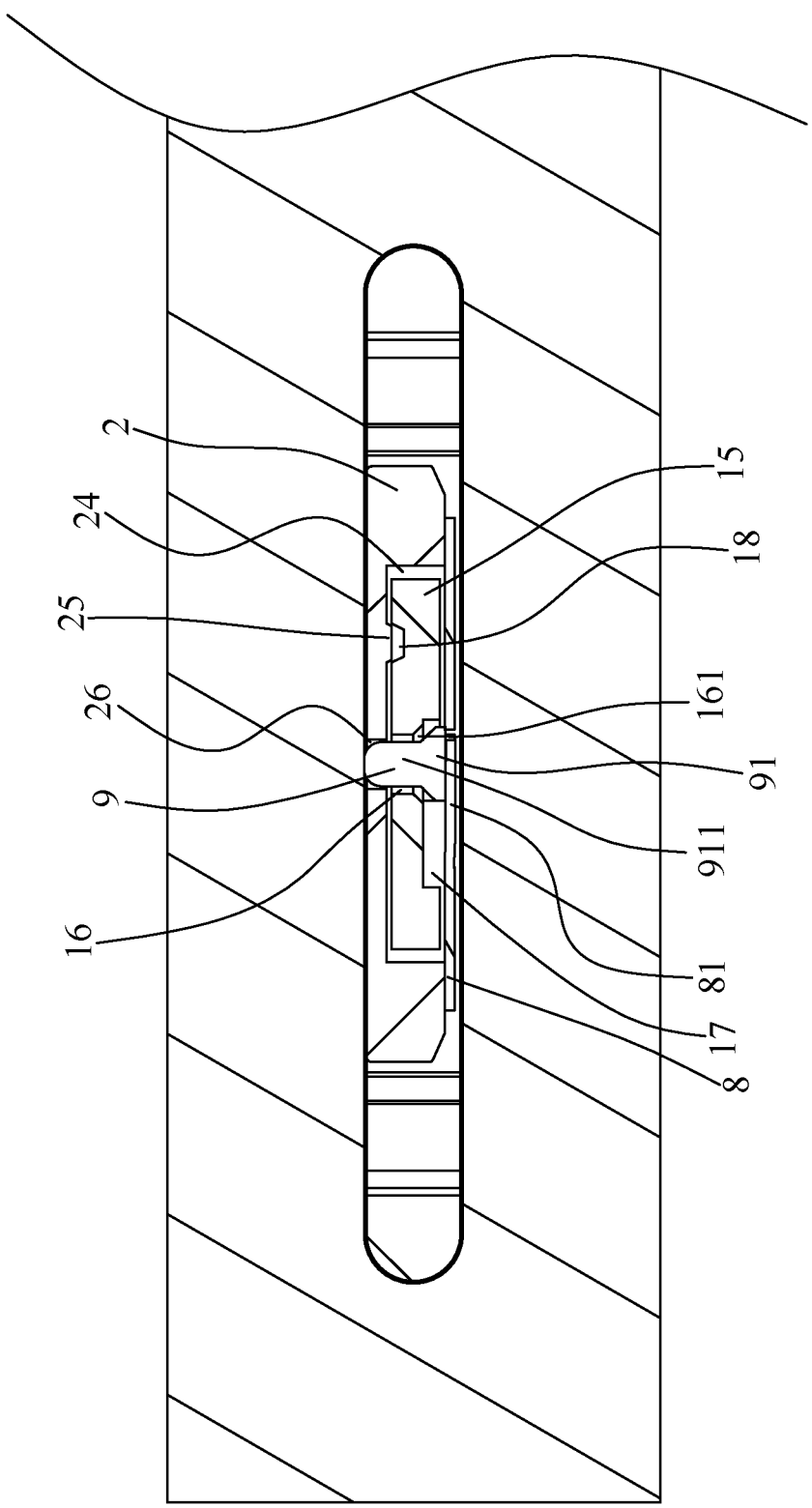
FIG. 14 is a sectional view of the button assembly installed in the internal component disposed to the lateral wall of the communication equipment in accordance with the present invention along a line XIV-XIV of FIG. 13.

With reference to FIG. 1 to FIG. 14, the button assembly 100 in accordance with a second preferred embodiment of the present invention is shown. The button assembly 100 is applied in the communication equipment 300. The button assembly 100 in accordance with the second preferred embodiment of the present invention, includes the pressing element 1, the tray 2, and the locking structure 200 connected between the pressing element 1 and the tray 2. Structures of the pressing element 1, the tray 2 and the locking structure 200 in accordance with the second preferred embodiment are different from structures of the pressing element 1, the tray 2 and the locking structure 200 in accordance with the first preferred embodiment.

A middle of one side surface of the pressing element 1 protrudes outward to form a combination portion 15. The combination portion 15 opens a perforation 16 vertically penetrating through the combination portion 15. A bottom surface of a peripheral wall of the perforation 16 is recessed upward to form a ring-shaped restricting slot 161 around the perforation 16. One side of the bottom surface of the combination portion 15 is recessed upward to form a second accommodating slot 17 connected with the restricting slot 161. The second accommodating slot 17 is communicated with the perforation 16 and the restricting slot 161. One side of a top surface of the combination portion 15 is recessed downward to form a positioning slot 18.

One end of the tray 2 facing the pressing element 1 opens a receiving space 24 penetrating through a rear surface of the tray 2 facing the pressing element 1 and a bottom surface of the tray 2. The receiving space 24 is matched with and is corresponding to the combination portion 15. The one end of the tray 2 opens a through-hole 26 vertically penetrating through a top of the tray 2. The through-hole 26 is corresponding to the perforation 16 and is communicated with the receiving space 24. An inner surface of a top wall of the receiving space 24 protrudes downward to form a positioning portion 25 matched with and corresponding to the positioning slot 18.

In the second preferred embodiment, the locking structure 200 is fastened to the pressing element 1 and the tray 2. The locking structure 200 includes a resilient element 8 and a fastening element 9. One end of the fastening element 9 has a circular stopping portion 91. A middle of a top surface of the stopping portion 91 protrudes upward to form an insertion portion 911 corresponding to the perforation 16. The insertion portion 911 of the fastening element 9 passes through the perforation 16, the restricting slot 161 and the through-hole 26.

The resilient element 8 is mounted to bottoms of the pressing element 1 and the tray 2, and is received in the receiving space 24. A middle of the resilient element 8 is punched outward to form an elastic portion 81 projecting beyond a top surface of the resilient element 8. The elastic portion 81 abuts against the stopping portion 91 of the fastening element 9.

When the button assembly 100 is assembled, at first, the combination portion 15 is accommodated in the receiving space 24, and the through-hole 26 and the perforation 16 are aligned and communicated with each other. Then, the fastening element 9 further passes through the perforation 16 and the through-hole 26 from bottom to top. Finally, the resilient element 8 is mounted to the bottoms of the combination portion 15 of the pressing element 1, the stopping portion 91 of the fastening element 9 and the tray 2, and covers the receiving space 24. At the moment, the elastic portion 81 is accommodated in the second accommodating slot 17, and the elastic portion 81 abuts against a bottom surface of the stopping portion 91 of the fastening element 9, and the resilient element 8 is fastened to the bottoms of the combination portion 15 of the pressing element 1, the stopping portion 91 of the fastening element 9 and the tray 2 by a spot welding way or a riveting press way.

Referring to FIG. 1 to FIG. 14, when the button assembly 100 is without being installed in the fastening slot 6 of the communication equipment 300, the elastic portion 81 of the resilient element 8 abuts upward against the fastening element 9 to make a top portion of the insertion portion 911 of the fastening element 9 exposed to the through-hole 26, at the moment, a periphery of a top surface of the stopping portion 91 abuts against a top peripheral wall of the restricting slot 161 to make the pressing element 1 have no way of moving, simultaneously, the positioning portion 25 is received in the positioning slot 18, so that the pressing element 1 and the tray 2 are fastened with each other. The resilient element 8 accumulates an elastic force by virtue of the resilient element 8 abutting against the fastening element 9.

When the button assembly 100 is installed in the fastening slot 6 of the communication equipment 300, a top wall of the fastening slot 6 abuts against the top portion of the insertion portion 911 of the fastening element 9 to push the fastening element 9 to move inward and into the fastening slot 6, at the moment, the insertion portion 911 of the fastening element 9 breaks away from the perforation 16 and the restricting slot 161, and the positioning portion 25 breaks away from the positioning slot 18, so that the tray 2 is loosened from the pressing element 1. When the user presses either end of the pressing element 1, the fastening element 9 is regarded as a central axis of the pressing element 1 to proceed a rotary displacement, and a gap is provided between the through-hole 26 and the fastening element 9 for facilitating that the pressing element 1 moves in the gap between the through-hole 26 and the fastening element 9 at the time of the pressing element 1 being pressed to rotate, and the tray 2 will be without being carried to move together with the pressing element 1. In this way, the tray 2 keeps a fixation status in the shell 73.

With reference to FIG. 9 to FIG. 14, when the button assembly 100 is withdrawn from the communication equipment 300, the elastic force accumulated by the resilient element 8 will make the fastening element 9 return to an initial position, so that the insertion portion 911 is reinstalled into the perforation 16 and the positioning portion 25 is received in the positioning slot 18 to fix the pressing element 1 with the tray 2 again.

As described above, the pressing element 1 and the tray 2 of the button assembly 100 are fixed with each other or loosened from each other by means of the button assembly 100 being equipped with the at least one locking element 3 or the fastening element 9 of the locking structure 200, the through-hole 26 or the perforation 16, and the elastic arm 4 or the resilient element 8, so that the pressing element 1 and the tray 2 are capable of being fastened with each other at the time of the pressing element 1 and the tray 2 being without being installed in the communication equipment 300. The pressing element 1 and the tray 2 is capable of being loosened from each other at the time of the button assembly 100 being installed in the communication equipment 300. When the user presses the two opposite ends of the pressing element 1 to activate the function of increasing or decreasing the volume of the communication equipment 300, the pressing element 1 is caused to rotate, the tray 2 can be unaffected by a rotation of the pressing element 1, so that the tray 2 keeps the fixation status in the shell 73, in this way, the pressing element 1 and the tray 2 are combined to save an assembling space of internal components of the communication equipment 300 to which the button assembly 100 is assembled.

What is claimed is:

1. A button assembly applied in a communication equipment, the button assembly comprising:
   a pressing element, one side surface of the pressing element being recessed inward to form an accommodating space, a top of the pressing element opening at least one first upper fixing hole communicated with the accommodating space, a middle of a bottom surface of the pressing element being recessed upward to form a first accommodating slot, a top wall of the first accommodating slot opening at least one first opening communicated with the accommodating space;
   a tray of which one side being mounted to and connected with the pressing element, the one side of the tray having a base portion, the base portion being mounted in the accommodating space, the base portion opening at least one second opening corresponding to the at least one first upper fixing hole, a bottom surface of a peripheral wall of the at least one second opening being recessed upward to form at least one locking slot around and communicated with the at least one second opening; and
   a locking structure fastened and connected between the pressing element and the tray, the locking structure including:
   at least one locking element, one end of the at least one locking element having a first blocking portion, a middle of the first blocking portion of the at least one locking element protruding upward to form a first locking portion corresponding to the at least one second opening and the at least one locking slot, the at least one locking element passing through the at least one first upper fixing hole, the at least one second opening and the at least one first opening corresponding to the at least one first upper fixing hole; and
   an elastic arm accommodated in the first accommodating slot, the elastic arm abutting upward against each first blocking portion of each locking element, a portion of the at least one locking element being exposed to the at least one first upper fixing hole, the first locking portion of the at least one locking element being assembled in the at least one second opening through the at least one locking slot, when the button assembly being installed in the communication equipment, the at least one locking element being pressed inward towards the pressing element by a bottom inner wall of the communication equipment, the first locking portion of the at least one locking element breaking away from the at least one locking slot, so that the tray is loosened from the pressing element.

2. The button assembly as claimed in claim 1, wherein the top of the pressing element opens two first upper fixing holes communicated with the accommodating space, the top of the pressing element further opens a second upper fixing hole located between the two first upper fixing holes, the second upper fixing hole is communicated with the accommodating space, the at least one first opening is defined as two first openings and the at least one second opening is defined as two second openings, a middle of the top wall of the first accommodating slot opens a lower first fixing hole penetrating upward through the top wall of the first accommodating slot and located between the two first openings, the lower first fixing hole is communicated with the accommodating space and is corresponding to the second upper fixing hole, the base portion further opens a fastening hole between the two second openings, the fastening hole is corresponding to the second upper fixing hole.

3. The button assembly as claimed in claim 2, wherein a top surface of a peripheral wall of the second upper fixing hole is recessed downward to form an upper limiting slot communicated with and around the second upper fixing hole, the locking structure further has a fixing element, the fixing element has a second blocking portion, and a second locking portion protruded downward from a middle of a bottom surface of the second blocking portion, the second locking portion of the fixing element passes through the second upper fixing hole, the fastening hole and the lower first fixing hole, the second blocking portion of the fixing element is limited in the upper limiting slot.

4. The button assembly as claimed in claim 3, wherein the elastic arm is accommodated in the first accommodating slot.

5. The button assembly as claimed in claim 4, wherein the elastic arm is fastened to bottoms of the fixing element and the first blocking portion of each locking element by a spot welding way or a riveting press way.

6. The button assembly as claimed in claim 1, wherein the locking structure includes a resilient element and a fastening element, one side surface of the pressing element protrudes outward to form a combination portion, one end of the fastening element has a stopping portion, the resilient element is fastened to bottoms of the combination portion of the pressing element, the stopping portion of the fastening element and the tray by a spot welding way or a riveting press way, a middle of the resilient element is punched outward to form an elastic portion projecting beyond a top surface of the resilient element, one end of the fastening element having a stopping portion, the elastic portion abuts against the stopping portion of the fastening element.

7. A button assembly applied in a communication equipment, the communication equipment opening a fastening slot, the button assembly comprising:
 a pressing element, one side surface of the pressing element protruding outward to form a combination portion opening a perforation;
 a tray mounted to the pressing element, the tray opening a receiving space penetrating through a rear surface of the tray and a bottom surface of the tray, the receiving space being matched with and corresponding to the combination portion, the tray opening a through-hole corresponding to the perforation and communicated with the receiving space; and
 a locking structure fastened between the pressing element and the tray, the locking structure comprising:
 a fastening element, one end of the fastening element having a stopping portion, a top surface of the stopping portion protruding upward to form an insertion portion corresponding to the perforation, the insertion portion passing through the perforation and the through-hole; and
 a resilient element received in the receiving space, the resilient element abutting upward against the fastening element to make a top portion of the insertion portion of the fastening element exposed to the through-hole, when the button assembly is installed in the fastening slot, a top wall of the fastening slot abutting against the top portion of the insertion portion of the fastening element to push the fastening element to move inward and into the fastening slot, at the moment, the insertion portion of the fastening element breaking away from the perforation, so that the tray is loosened from the pressing element.

8. The button assembly as claimed in claim 7, wherein a top surface of the combination portion is recessed downward to form a positioning slot, an inner wall of a top wall of the receiving space protrudes downward to form a positioning portion corresponding to the positioning slot, the positioning portion is received in the positioning slot.

9. A button assembly applied in a communication equipment, a lateral wall of the communication equipment opening a fastening slot, the button assembly comprising:
 a pressing element, one side surface of the pressing element protruding outward to form a combination portion, the combination portion opening a perforation, a bottom surface of a peripheral wall of the perforation being recessed upward to form a restricting slot;
 a tray mounted to the pressing element, one end of the tray facing the pressing element opening a receiving space penetrating through a rear surface of the tray facing the pressing element and a bottom surface of the tray, the receiving space being matched with and corresponding to the combination portion, the one end of the tray opening a through-hole, the through-hole being corresponding to the perforation and being communicated with the receiving space; and
 a locking structure fastened between the pressing element and the tray, and connected between the pressing element and the tray, the locking structure comprising:
 a fastening element, one end of the fastening element having a stopping portion, a top surface of the stopping portion protruding upward to form an insertion portion corresponding to the perforation, the insertion portion passing through the perforation, the restricting slot and the through-hole; and
 a resilient element mounted to bottoms of the tray and the pressing element, and received in the receiving space, the resilient element abutting upward against the fastening element to make a top portion of the insertion portion of the fastening element exposed to the through-hole, when the button assembly is installed in the fastening slot of the communication equipment, a top wall of the fastening slot abutting against the top portion of the fastening element to push the fastening element to move inward and into the fastening slot, at the moment, the insertion portion of the fastening element breaking away from the perforation and the restricting slot, so that the tray is loosened from the pressing element.

10. The button assembly as claimed in claim 9, wherein a top surface of the combination portion is recessed downward to form a positioning slot, an inner wall of a top wall of the receiving space protrudes downward to form a positioning portion corresponding to the positioning slot, the positioning portion is received in the positioning slot.

* * * * *